United States Patent [19]
Tsunoda

[11] Patent Number: 6,023,231
[45] Date of Patent: Feb. 8, 2000

[54] MESSAGE COMMUNICATION SYSTEM

[75] Inventor: Kazuyuki Tsunoda, Shizuoka, Japan

[73] Assignee: NEC Corporation, Tokyo, Japan

[21] Appl. No.: 08/988,088

[22] Filed: Dec. 10, 1997

[30] Foreign Application Priority Data

Dec. 10, 1996 [JP] Japan .................................. 8-329246

[51] Int. Cl.⁷ .................................................. H04B 1/38
[52] U.S. Cl. .................... 340/825.44; 455/38.4; 455/566; 455/575; 455/90; 455/344; 370/310; 370/311; 370/312; 370/314; 370/428; 370/470; 370/471
[58] Field of Search ............... 340/825.44; 455/38.4, 455/566, 575, 90, 344; 370/310, 311, 312, 314, 470, 471, 428

[56] References Cited

U.S. PATENT DOCUMENTS 5,583,921  12/1996  Hidaka ............................ 379/93.05
5,659,890  8/1997  Hidaka ............................... 455/575

FOREIGN PATENT DOCUMENTS

6-209276  7/1994  Japan .

*Primary Examiner*—Brian Zimmerman
*Assistant Examiner*—Yves Dalencourt
*Attorney, Agent, or Firm*—Whitham, Curtis & Whitham

[57] ABSTRACT

In a selective call receiver with a display and a DTMF transmitter, a limit length of transmission message is set and a transmission message is displayed such that a first part of the message which is not longer than the limit length is displayed in a first image and a second part thereof exceeding the limit length is displayed in a second triage different from the first image. After transmitting the first part of the message through the transmitter, a predetermined indicator is displayed on screen for indicating that the second part is left without transmitted before transmitting the second part depending on a transmission instruction.

20 Claims, 8 Drawing Sheets

| | 1 | 2 | 3 | 4 | 5 | 6 | 7 | 8 | 9 | 0 |
|---|---|---|---|---|---|---|---|---|---|---|
| 1 | ア | イ | ウ | エ | オ | A | B | C | D | E |
| 2 | カ | キ | ク | ケ | コ | F | G | H | I | J |
| 3 | サ | シ | ス | セ | ソ | K | L | M | N | O |
| 4 | タ | チ | ツ | テ | ト | P | Q | R | S | T |
| 5 | ナ | ニ | ヌ | ネ | ノ | U | V | W | X | Y |
| 6 | ハ | ヒ | フ | ヘ | ホ | Z | ? | ! | ─ | ／ |
| 7 | マ | ミ | ム | メ | モ | ¥ | & | 🕛 | ☎ | ☕ |
| 8 | ヤ | ( | ユ | ) | ヨ | * | # | | ♥ | |
| 9 | ラ | リ | ル | レ | ロ | 1 | 2 | 3 | 4 | 5 |
| 0 | ワ | ヲ | ン | ゛ | ゜ | 6 | 7 | 8 | 9 | 0 |

COL. / ROW

FIG. 3B

| MESSAGE | INPUT CODE |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 0 | 0 |
| SPACE | *8 |
| ─ | *2 |
| [ | *6 |
| ] | *4 |

# MESSAGE COMMUNICATION SYSTEM

BACKGROUND OF THE INVENTION

1. Field of the Invention

The present invention relates to wireless selective calling systems, and in particular to a message transceiver such as a selective call receiver with transmission function and a message transmission control method therefor.

2. Description of the Related Art

Recently, there has been proposed a selective call receiver with a message transmission function, for instance, in Japanese Patent Laid-open Publication No. 6-209276. This kind of receiver is provided with a DTMF (Dual Tone Multi-frequency) transmitter and memories storing conversion tables such as a character matrix table and a fixed-message table. In the case where a user creates a desired message (hereinafter, called "free word message"), the character matrix table is searched for the corresponding codes depending on the user's instructions. The created message is transmitted by the DTMF transmitter through the telephone network and then the selective calling system to the destination selective call receiver. In Japan, since the character matrix table for free word message has been standardized, a free word message can be transmitted through any common carrier.

In such a selective calling system, however, it is difficult to increase a length of transmission message because a longer message occupies a line for a longer time, resulting in a network traffic jam. Especially, in the cases where the caller's name is transmitted so that the called party can know who is calling, the number of free word message characters becomes smaller. Therefore, there are available some selective call receivers where input characters are canceled and cleared when exceeding a predetermined limit. The user of such a receiver needs to create a message while looking at the number of message characters.

Further, at present, the number of message characters available is different from one common carrier to another. Therefore, the user further needs to know which common carrier provides the selective call receiver of the opposite party before creating a message while looking at the number of message characters which is determined in the common carrier of the destination receiver.

SUMMARY OF THE INVENTION

An object of the present invention is to provide a transmission control method and a message communication apparatus which can achieve easy transmission operations of a desired length of message.

Another object of the present invention is to provide a message communication apparatus and a transmission control method which can create and transmit a desired message without looking at a length of the message.

According to an aspect of the present invention, in a message communication apparatus having a display and a transmitter, a limit length of transmission message is set and a predetermined length of message included in a transmission message is displayed such that a first part of the message which is not longer than the limit length is displayed in a first image and a second part thereof exceeding the limit length is displayed in a second image different from the first image. After transmitting the first part of the message through the transmitter, a predetermined indicator is displayed on screen for indicating that the second part is left without transmitted if the transmission message is longer than the limit length.

Since the predetermined indicator is displayed on screen for indicating that the second part is left without transmitted, the user can be easily informed of whether a length of the transmission message exceeds the limit length before transmitting the remaining parts.

The predetermined indicator may be a prompt menu for split transmission of the second part which recursively repeats a series of the message displaying, the transmitting of the first part, and the indicator displaying until the transmission message has been transmitted.

According to another aspect of the present invention, in a selective call receiver hang an input section, a display and a DTMF (Dual Tone Multi-frequency) transmitter, a limit length of transmission message is determined by a number of characters and a transmission message consisting of a desired number of characters is stored The transmission message is split into a plurality of blocks each not longer than the limit length, and the blocks are sequentially transmitted depending on whether a transmission instruction is input for each block.

Since the transmission message is sequentially transmitted in blocks shorter than the limit length, a desired length of message can be transmitted without degrading network performance, resulting in reliable data transmission. Further, since the blocks are sequentially transmitted depending on an easy transmission instruction, erroneous transmission operations can be substantially reduced.

The limit length of the transmission message may be determined depending on a selective calling system such that the Limit length is shorter than a maximum length of transmission message determined in the selective calling system. Therefore, a selective call receiver can be applied to a plurality of different selective calling systems.

DETAILED DESCRIPTION OF THE PREFERRED EMBODIMENTS

Figure 1:
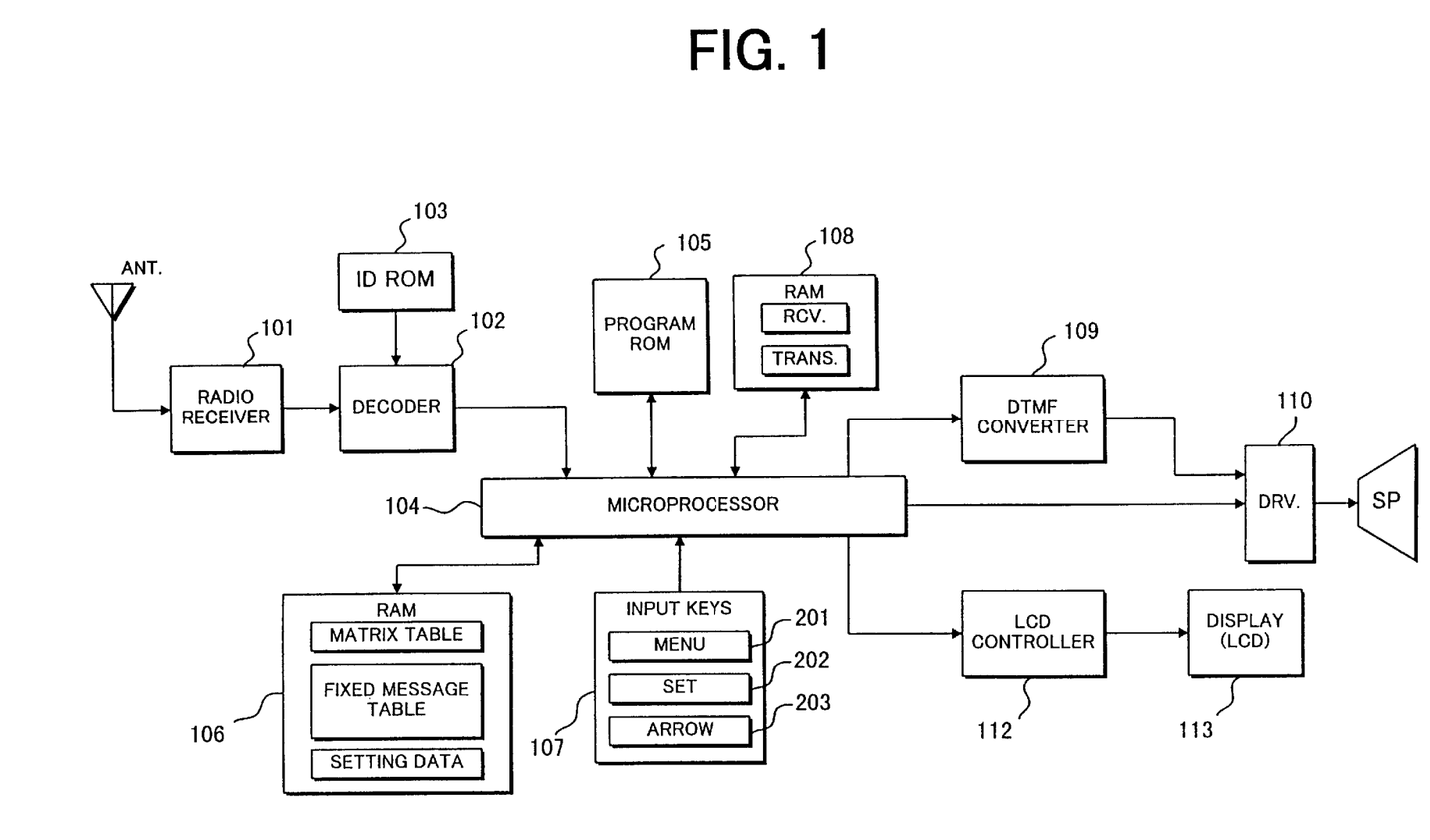
FIG. 1 is a block diagram showing an embodiment of a selective call receiver according to the present invention.

Referring to FIG. 1, a selective call receiver according to an embodiment of the present invention has a DTMF transmitting function in addition to a receiving function. In other words, the selective call receiver is capable of receiving a radio selective calling signal from a radio base station (not shown) which is connected to a public switched telephone network and of transmitting a calling signal carrying a message through a subscriber telephone line.

A receiving antenna is connected to a radio receiver 101 which receives and demodulates a radio wave into a baseband signal. When receiving the baseband calling signal from the radio receiver 101, a decoder 102 decodes the baseband calling signal and then compares a calling number ed in the baseband calling signal with the identification number previously stored in a read-only memory (ID-ROM) 103 which may be a P-ROM (programmable read-only memory). When the detected calling number is coincident with the identification number of its own, the decoder 102 informs a microprocessor 104 of call incoming.

The microprocessor 104 performs the operation controls according to programs stored in a program memory 105 as described later. The program memory 105 previously stores necessary control programs for message creation, receiving/transmitting, message displaying, and other functions. These operation controls are performed by the microprocessor 104 using a ROM 106 storing a character matrix table, a fixed message table and other setting data. In addition, the microprocessor 104 receives an instruction of the user through an input controller 107 including a menu key 201, a set key 202 and an arrow key 203. For instance, the user uses these input keys to instruct the microprocessor 104 to perform menu selection, determination, dialing, and other function. Moreover, the microprocessor 104 uses a random access memory (RAM) 103 to store received messages and created transmission messages.

In this embodiment, the transmission function is implemented with a DTMF converter 109, a speaker driver 110, and a speaker 111. More specifically, when receiving transmission data including a calling number and a transmission message from the microprocessor 104, the DTMF converter 112 converts the transmission data into a tone signal suitable for the telephone line in well-known DTMF technology. The tone signal is converted to a sound wave by the speaker 113. In other words, the DTMF converter 112 and the speaker 113 compose a kind of acoustic coupler. The sound wave generated with the speaker 113 is converted into an electric signal with the microphone of a telephone set (not shown) and then it travels to a receiver on the opponent side through the telephone network and the radio base station. Since the speaker 113 can be also used as a beeper which informs the user of an incoming call, another speaker need not be independently provided.

It should be noted that a similar transmission function can be obtained in place of the acoustic coupler with a well-known connector directly connected with the subscriber line. Needless to say, the transmitter is not limited to a specific transmission scheme but a transmission device suitable for being mounted within a selective call receiver.

In the case where message data following the calling number is received, the microprocessor 104 analyzes the message data. If a certain conversion code for fixed message is included in the message data, the microprocessor 104 searches the fixed message table and the character matrix table of the ROM 106 for a fixed message and characters corresponding thereto. A display controller 112 receives the data and other necessary information from the microprocessor 104 and controls a liquid crystal display (LCD) 113 such that the message characters and necessary information are displayed on screen.

Figure 2:
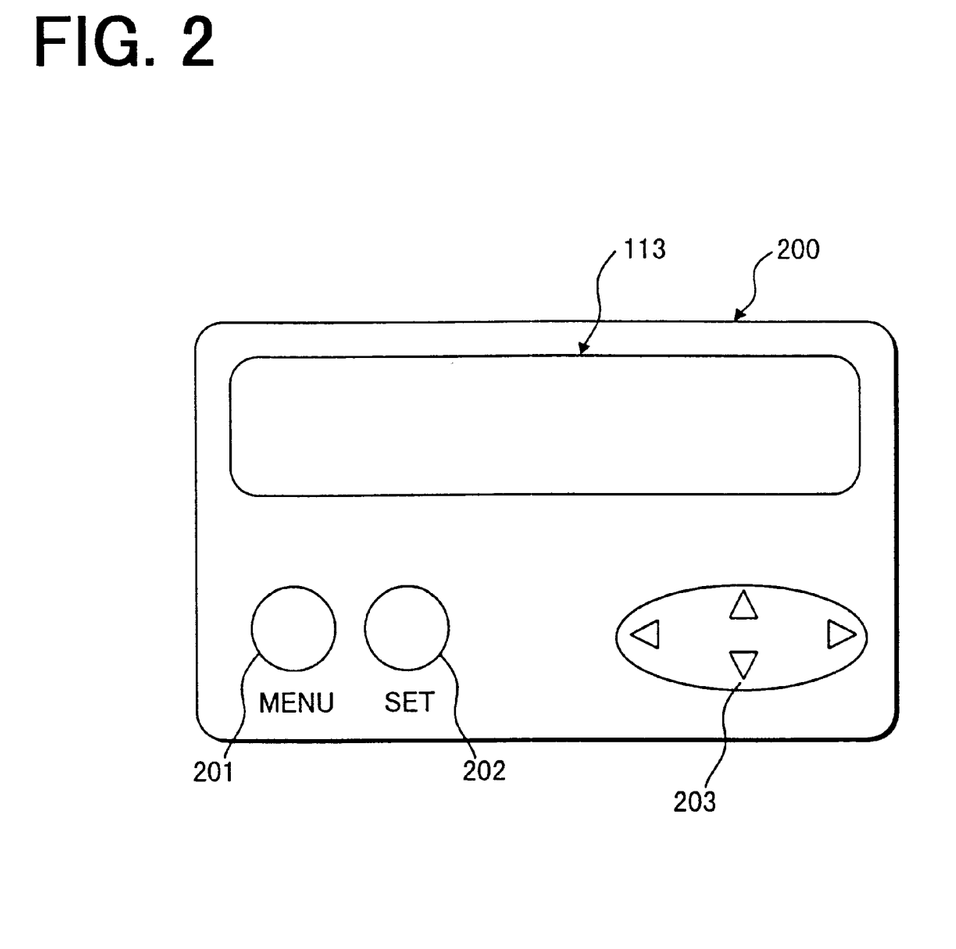
FIG. 2 is a plan view of the selective call receiver according to the present invention.

As shown in FIG. 2, a main body 200 of the selective call receiver is provided with the LCD 113, menu key 201, set key 202 and arrow key 203.

Figure 3A:
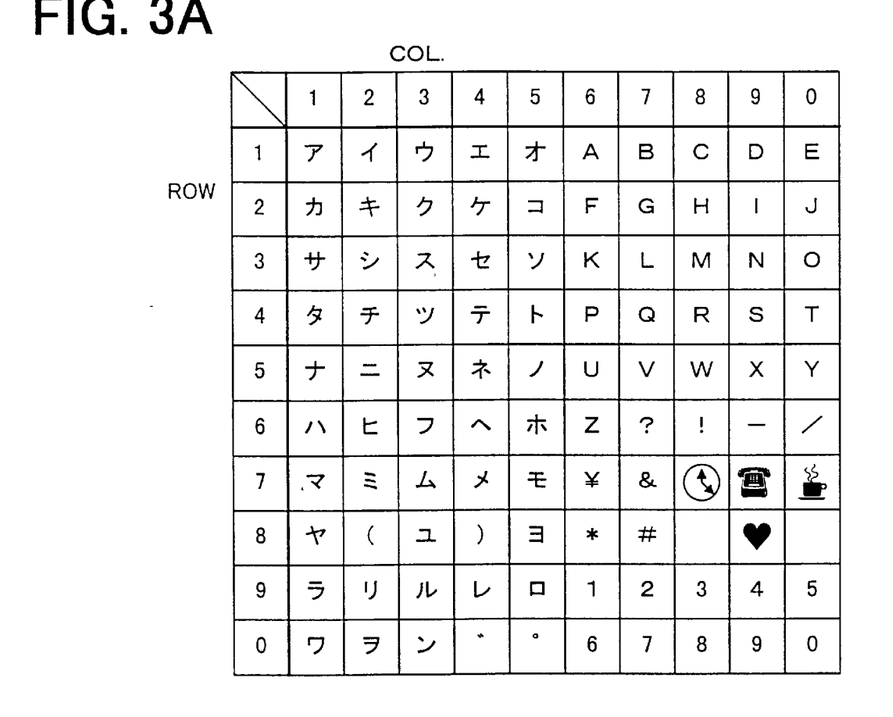
FIG. 3A is a schematic diagram showing an example of the contents of a character matrix table for explanation of free word message creation.
Figure 3B:
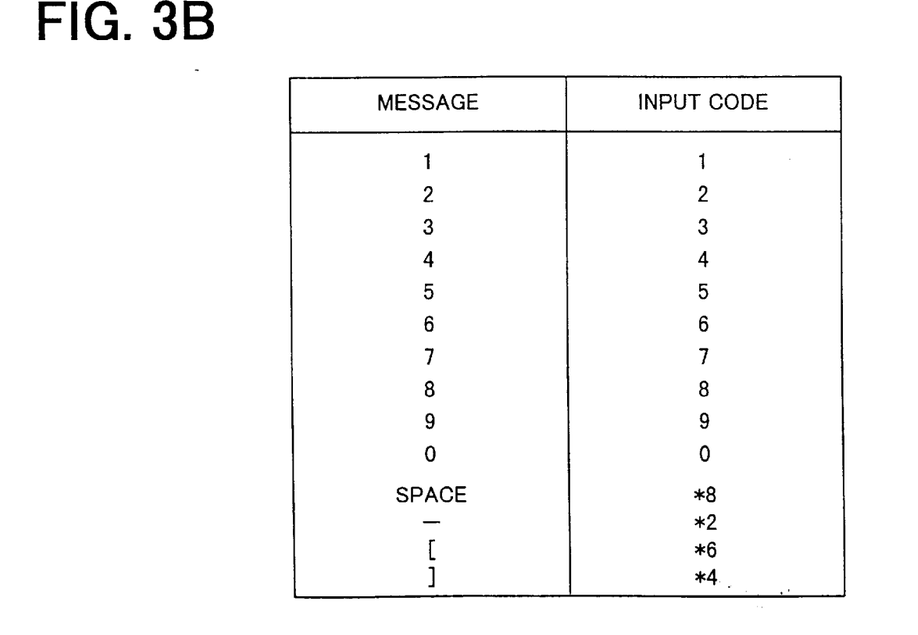
FIG. 3B is a schematic diagram showing an example of an alphanumeric table.

FIG. 3A shows an example of the character matrix table, the contents of which is stored in the ROM 106. The character matrix table is used for conversion between a message and transmission code data. In the case of free word message transmission, when a certain character is input by the user using input key, the microprocessor 104 searches the matrix table to convert the input character to the predetermined conversion code (e.g. "*2*2") followed by a row number and a column number. For example, an input character "ABC" is converted into "*2*2161718". In the case of receiving, when the predetermined conversion code is detected, the microprocessor 104 recognizes each two of the codes following the conversion code as a column code and a row code. Then, the microprocessor 104 searches the matrix table for characters corresponding to the received column and row codes, respectively. As shown in FIG. 3B, a dialing number is selected as in a touch-tone telephone.

Transmission Length Limit

In the selective call receiver described above, a length of a free word message, or the number of characters included therein, is limited to a predetermined figure N. The length limit N is obtained by the following equation: $N=(N_{OP}-N_{CONV})/2$, where $N_{OP}$ is the maximum number of transmission codes in characters and $N_{CONV}$ is the number of conversion codes in characters. $N_{OP}$ can be previously set by the user. $N_{OP}$ may be set to two figures corresponding to different common carriers, respectively. According to the example as described above, $N_{CONV}=2$ because the predetermined conversion code is "*2*2" corresponding to the length of two characters.

Operation

Figure 4:
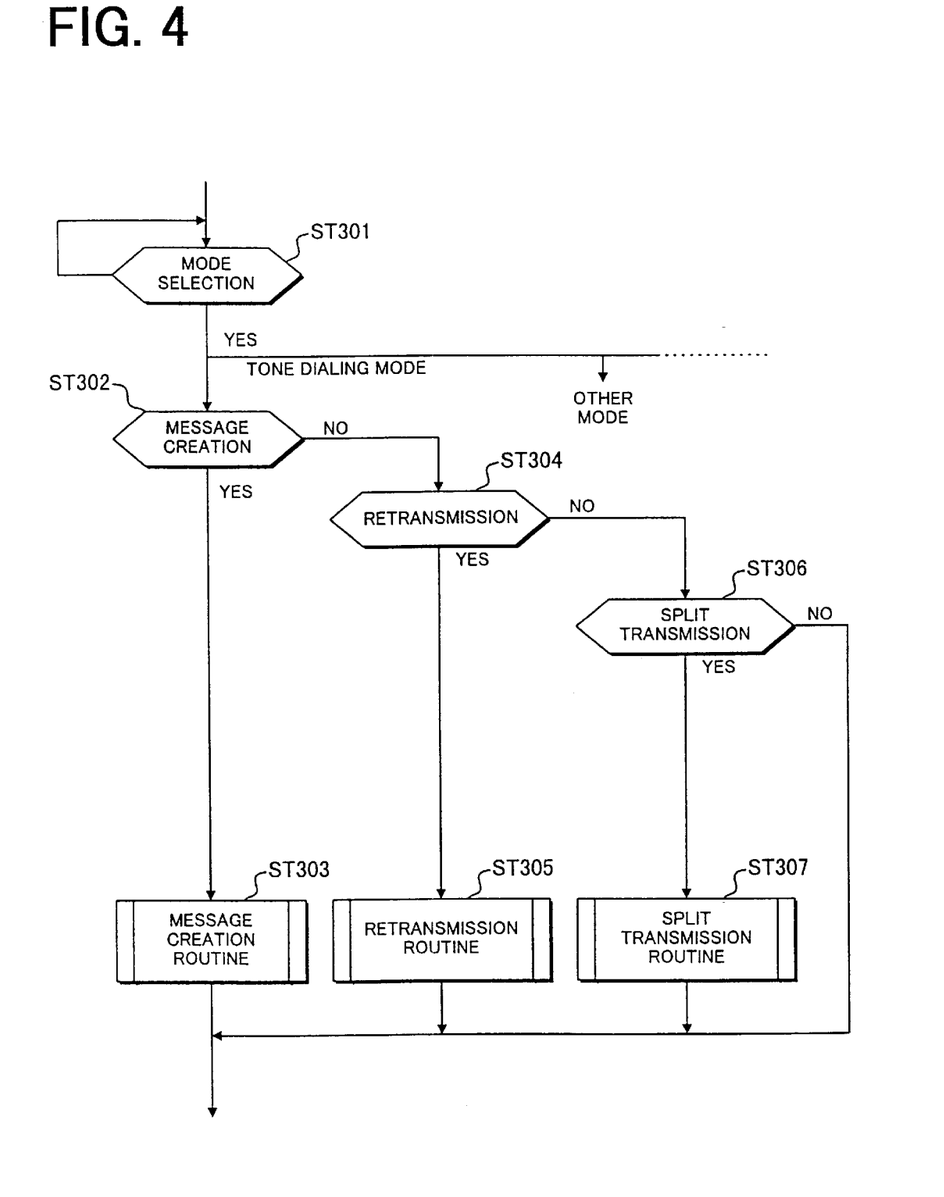
FIG. 4 is a flow chart showing an example of menu operation in the selective call receiver according to a first embodiment of the present invention.

Referring to FIG. 4, when tone dialing mode is selected on the menu (YES in step ST301), there are displayed on screen three alternatives: message creation, retransmission, and split transmission. When message creation is selected and entered (YES in ST302), a message creation routine is called and executed (ST303). When retransmission is selected and entered (YES in ST304), a retransmission routine is called and executed (ST305). And similarly, when split transmission is selected and entered (YES in ST306), a split transmission routine is called and executed (ST307). The details of the message creation and the split transmission will be described hereinafter.

Message Creation

Figure 5:
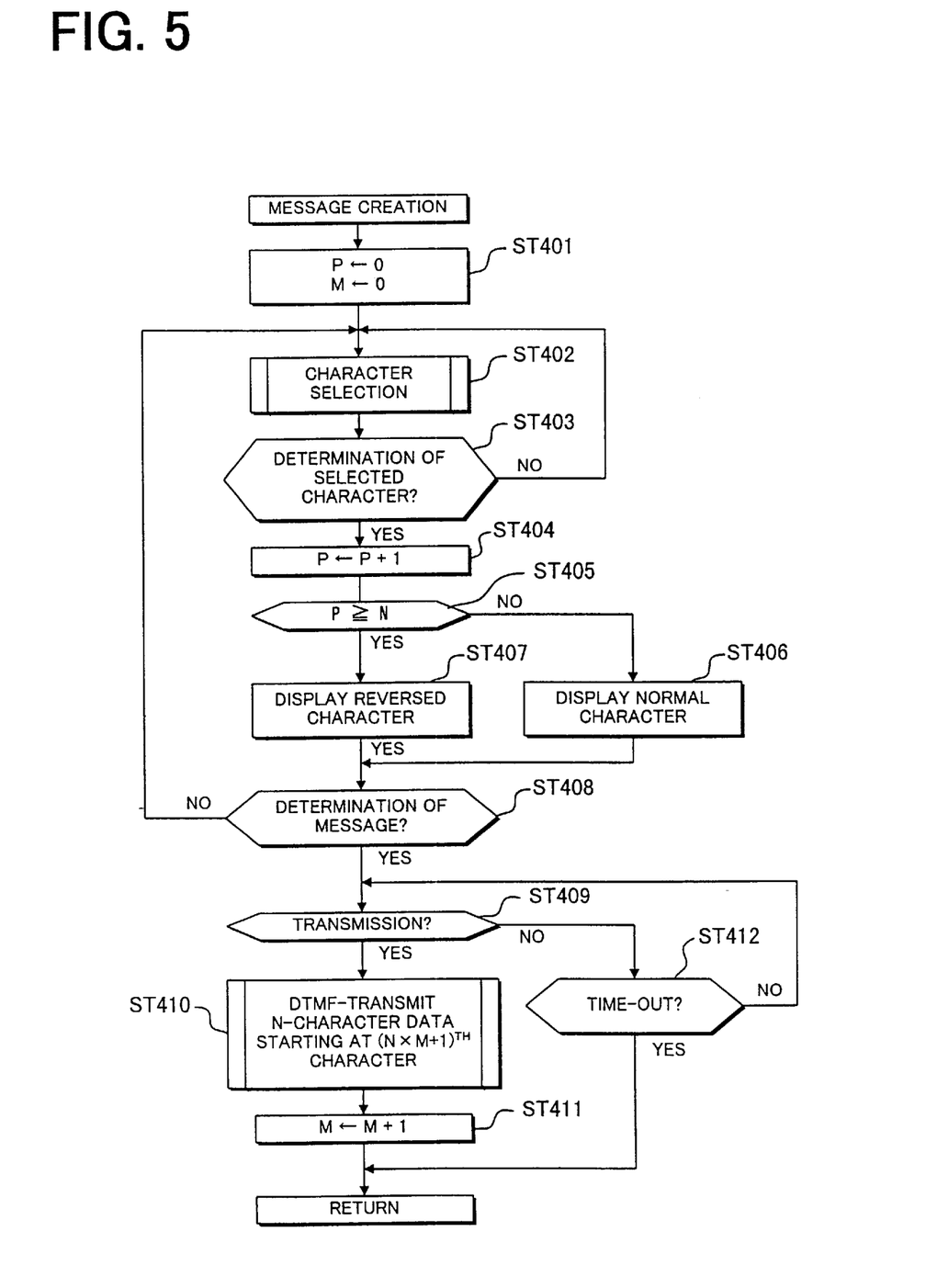
FIG. 5 is a flow chart showing a message creation method according to the first embodiment.

Referring to FIG. 5, when message creation is selected and entered, two variables P and M are initialized (ST401). The microprocessor 104 reads character selection setting data from the ROM 106 and thereby a character selection image is displayed on screen (ST402). When the user selects a single character and inters the selected one (YES in ST403), the variable P is incremented by one (ST404) and then the incremented P is compared with the predetermined length limit figure N (ST405). If P<N (NO in ST405), the entered character is normally displayed on screen (ST406). If P≧N (YES in ST405), the entered character is displayed on screen in reversed image (ST407). The above steps ST402–ST408 are repeated until a transmission message has been completed and determined (ST408).

After the transmission message has been completed and determined (YES in ST408), the microprocessor 104 waits for transmission instruction while monitoring a timer which is set to a predetermined time period. When the transmission instruction is entered (YES in ST409), the microprocessor 104 converts N characters staring at the (NM+1)$^{th}$ character into message codes by referring to the character matrix table. Subsequently, the predetermined conversion code followed by the N-character message codes are transferred to the DTMF converter 109. The DTMF converter 109 converts the conversion code accompanied by the N-character message codes into tone signal and then transmits them to the telephone line through the speaker 111 (ST410). After that, the variable M is incremented (ST411) and then control is returned to the main control flow. On the other hand, when a timeout occurs without entering the transmission instruction (YES in ST412), control is also returned to the main control flow.

Therefore, in the case of a transmission message longer than the length limit N, the DTMF transmission is stopped after the first N-character data has been transmitted. Since there are other message data left, control returns to the tone dialing mode Alternatively, the presence of message data may be indicated by a desired icon on screen. Transmission of the remaining character data is performed when the split transmission is selected and entered.

Split Transmission

Figure 6:
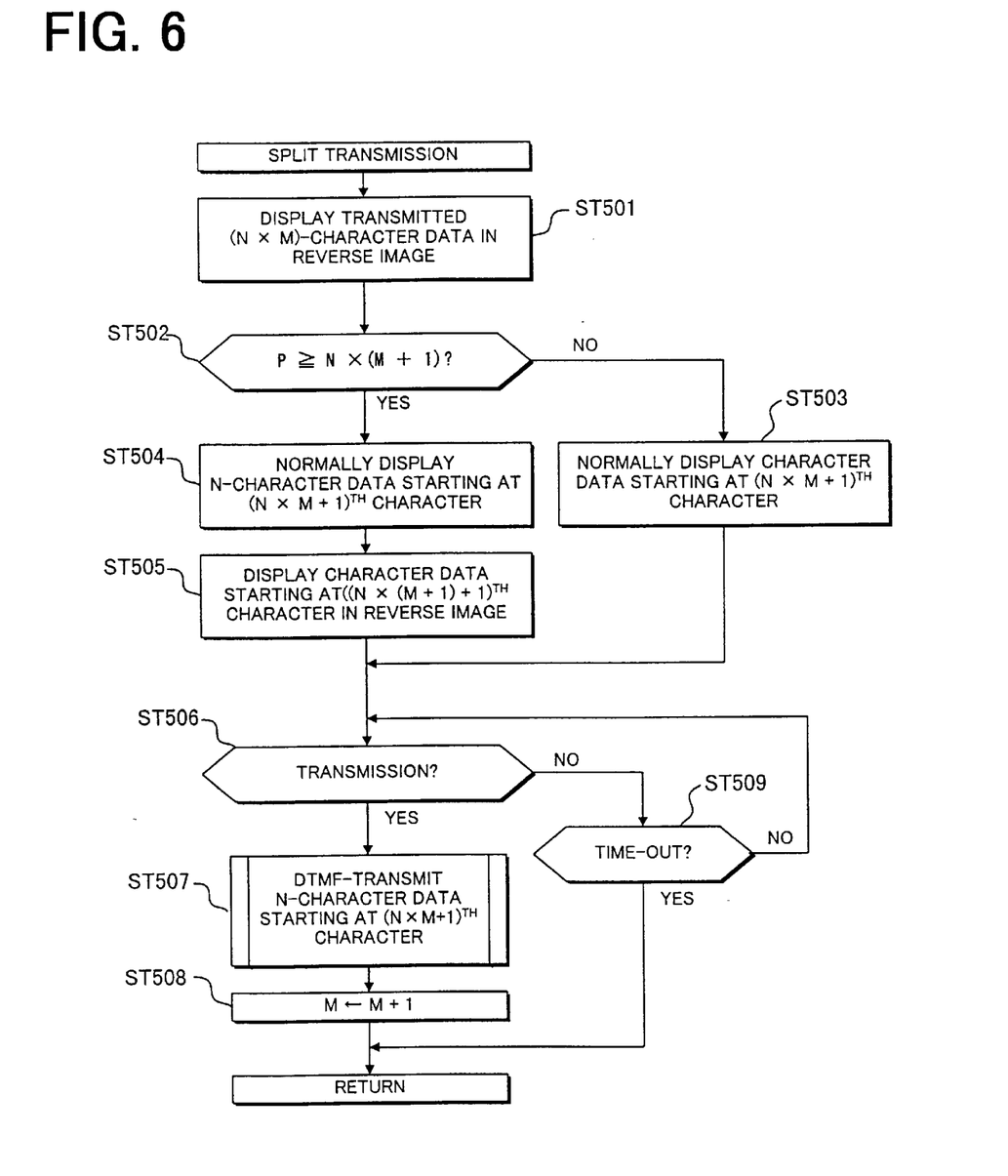
FIG. 6 is a flow chart showing a split transmission method according to the first embodiment.

Referring to FIG. 6, when split transmission is selected and entered after the message creation, the (N×M) characters which have been transmitted are displayed on screen in reverse image (ST501) and then the variable P is compared with N(M+1) (ST502). If P<N(M+1) (NO in ST502), any entered character starting at (NM+1)$^{th}$ character is normally displayed on screen (ST503). If P≧N(M+1) (YES in ST502), N characters starting at (NM+1)$^{th}$ character are normally displayed on screen (ST504) ad N characters starting at (N(M+1)+1)$^{th}$ character are displayed on screen in reversed image (ST505).

After that, the microprocessor 104 waits for transmission instruction while monitoring a timer which is set to the predetermined time period. When the transmission instruction is entered (YES in ST506), the microprocessor 104 converts N characters starting at the (NM+1)$^{th}$ character into split message codes by referring to the character matrix table. Subsequently, the predetermined conversion code followed by the N-character split message codes are transferred to the DTMF converter 109. The DTMF converter 109 converts the conversion code accompanied by the N-character split message codes into tone signal and then transmits them to the telephone line through the speaker 111 (ST507). After that, the variable M is incremented (ST508) and then control is returned to the main control flow On the other hand, when a timeout occurs without entering the transmission instruction (YES in ST509), control is also returned to the main control flow.

Example of Display Image Sequence

Figure 7:
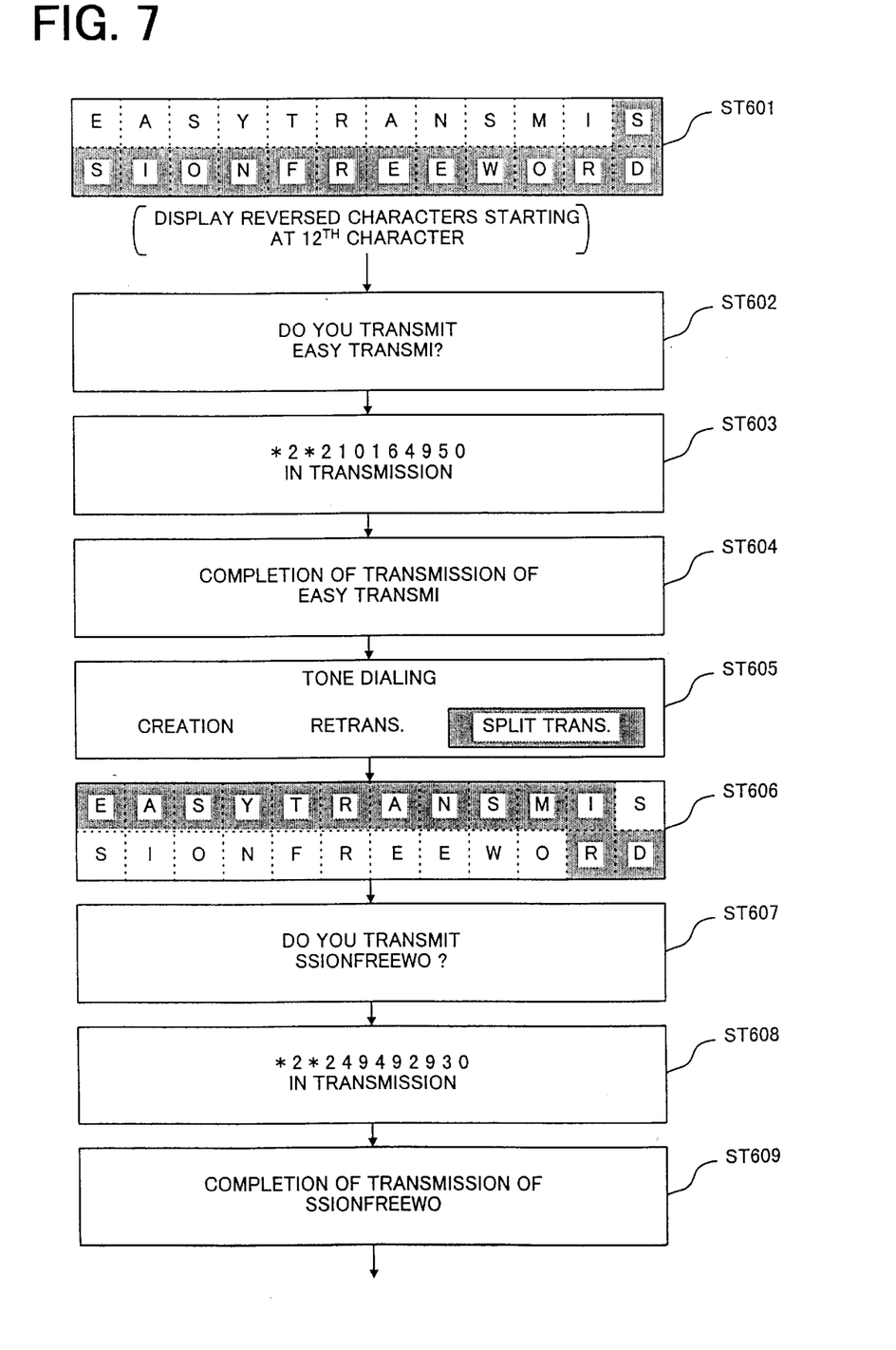
FIG. 7 is a flow chart showing an example of a sequence of displayed messages according to the first embodiment.

Referring to FIG. 7, there is shown a sequence of displayed images on screen in the case where the message creation and the split transmission are sequentially performed. In this case, it is assumed that the maximum number of transmission codes in characters: $N_{OP}$=24 and the number of conversion codes in characters: $N_{CONV}$=2. Therefore, as described before, the message length limit N=($N_{OP}$−$N_{CONV}$)/2=(24−2)/2=11. Further, taking a free word message "EASYTRANSMISSIONFREEWORD" (P=24), as an example, the display image sequence will be described hereinafter.

Since P>N, the first eleven characters "EASYTRANSMI" are normally displayed and the remaining characters "SSIONFREEWORD" are displayed in reverse image (ST601). When the transmission message is entered, the message "DO YOU TRANSMIT EASYTRANSMI?" is displayed (ST602). When the transmission instruction is entered, that is, the user depresses the set key 202, the microprocessor 104 converts the first eleven characters into message codes because M=0. Then, the predetermined conversion code followed by the eleven-character message codes "*2*210164950 . . . " are transmitted through the DTMF converter 109 (ST603). After the first transmission is completed, the variable M is incremented and the message "COMPLETION OF TRANSMISSION OF EASYTRANSMI" is displayed on screen (ST604).

Since there are the remaining message data "SSIONFREEWORD" left, the tone dialing menu is displayed so that the user is prompted to select and enter one of the three alternatives (ST605) When split transmission is selected and entered, the first eleven characters "EASYTRANSMI" which have been successfully transmitted are displayed in reverse image and the second eleven characters "SSIONFREEWO" are normally displayed (ST606).

When the transmission message is entered, the message "DO YOU TRANSMIT SSIONFREEWO?" is displayed (ST607). When the transmission instruction is entered, that is, the user depresses the set key 202, the microprocessor 104 converts the second eleven characters into message codes because M=1. Then, the predetermined conversion code followed by the eleven-character message codes "*2*249492930 . . . " are transmitted through the DTMF converter 109 (ST608). After the second transmission is completed, the variable M is incremented and the message "COMPLETION OF TRANSMISSION OF SSIONFREEWORD" is displayed on screen (ST609). In this manner, the split transmission sequence ST605–ST609 is repeated until all message characters have been transmitted.

Figure 8:
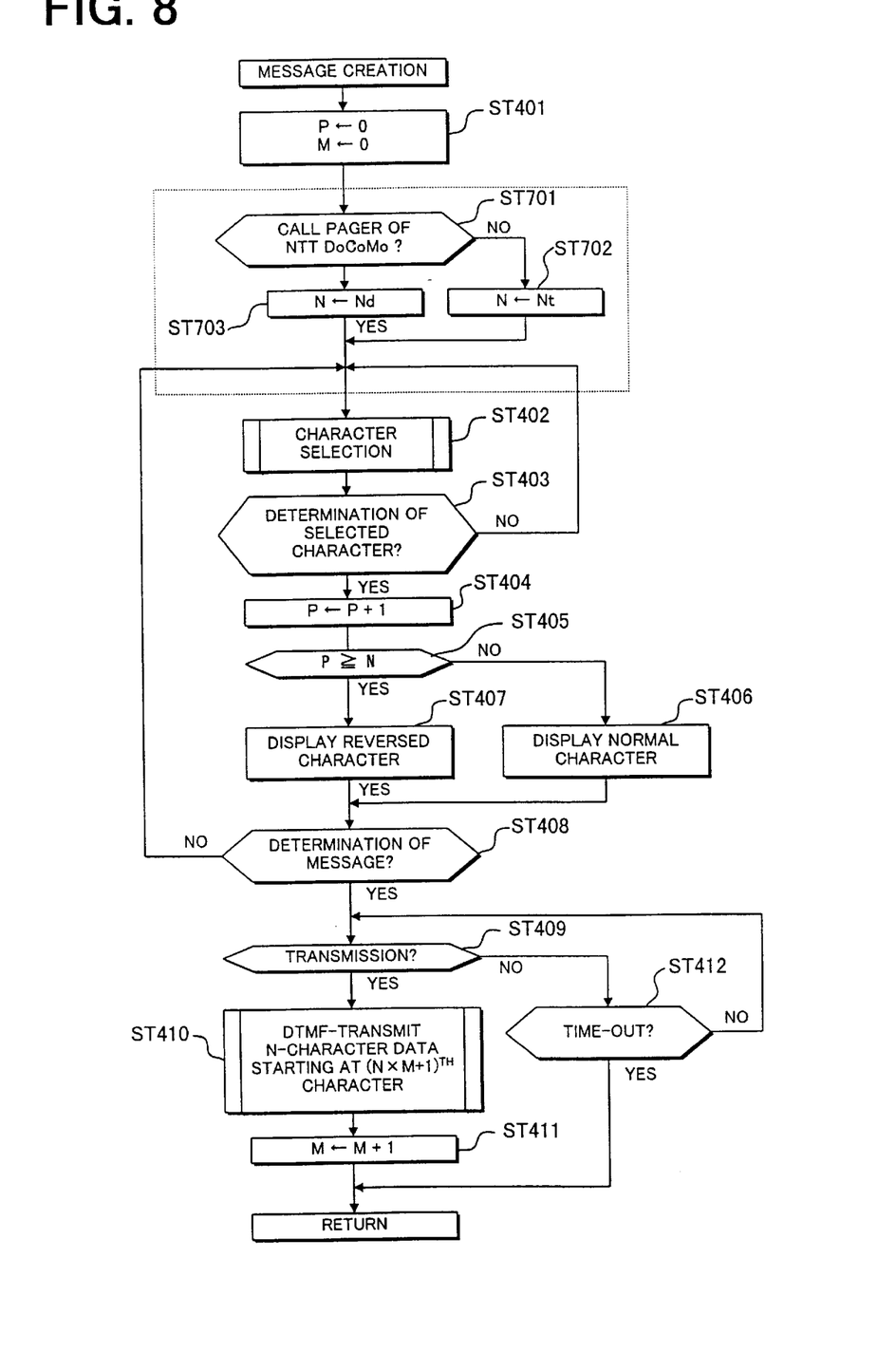
FIG. 8 is a flow chart showing a message creation method according to a second embodiment of the present invention.

Referring to FIG. 8, there is shown a second embodiment of the present invention. In the second embodiment, there are set two figures $N_{OP1}$ and $N_{OP2}$ corresponding to different common carriers, respectively. Therefore, two different length limits Nd and Nt are obtained as described before. As shown in FIG. 8, when message creation is selected and entered, two variables P and M are initialized (ST401). Subsequently, the user is prompted to select and enter one of two different common carriers (here, NTT DoCoMo and another common carrier) (step ST701). When NTT DoCoMo is not selected, the length limit N is set to Nt (ST702). When NTT DoCoMo is selected, the length limit N is set to Nd (ST703). Since the following steps are the same as in FIG. 5, the details are omitted.

What is claimed is:

1. A control method for a message communication apparatus having a display and a transmitter, comprising the steps of:

a) setting a limit length of transmission message;

b) storing a transmission message;

c) displaying a predetermined length of message included in the transmission message such that a first part of the message which is not longer than the limit length is displayed in a first image and a second part thereof exceeding the limit length is displayed in a second image different from the first image;

d) transmitting the first part of the message through the transmitter; and e) displaying a predetermined indicator for indicating that the second part is left without transmitted if the transmission message is longer than the limit length.

2. The control method according to claim 1, wherein the predetermined indicator of the step e) is a prompt menu for split transmission of the second part which recursively repeats the steps c) to e) until the transmission message has been transmitted.

3. The control method according to claim 2, wherein the split transmission comprises the steps of:
   f) displaying the message such that a first part of the second part which is not longer than the limit length is displayed in the first image and the message other than the first part of the second part is displayed in the second image, when the split transmission of the second part is selected;
   g) transmitting the first part of the second part through the transmitter; and
   e) displaying the prompt menu for indicating that the second part has a second part thereof left without transmitted if the second part is longer than the limit length.

4. The control method according to claim 1, wherein the limit length of the transmission message is determined depending on a selective calling system such that the limit length is shorter than a maximum length of transmission message determined in the selective calling system.

5. The control method according to claim 4, wherein the limit length N (N is an positive integer) of the transmission message is determined by the following equation: $N=(N_{OP}-N_{CONV})/2$, where $N_{OP}$ is the maximum number of transmission characters determined by the selective calling system and $N_{CONV}$ is the number of conversion code characters which are added to the transmission message.

6. The control method according to claim 4, wherein the limit length is selected from a predetermined set of limit lengths depending on a selective calling system to which a selective call receiver of a called party belongs.

7. A method for transmitting a message in a selective call receiver having an input section, a display and a DTMF (Dual Tone Multi-frequency) transmitter, comprising the steps of:
   a) storing a limit length of transmission message, where the limit length is determined by a number of characters;
   b) storing a transmission message consisting of a desired number of characters;
   c) splitting the transmission message into a plurality of blocks each not longer than the limit length; and
   d) transmitting the blocks sequentially depending on whether a transmission instruction is input for each block.

8. The method according to claim 7, wherein the step c) further comprises the step of:
   c-1) displaying a predetermined length of message included in the transmission message such that a first block of the message is displayed in a normal image and blocks other than the first block are displayed in a reverse image, and
   the step d) comprises the step of:
   d-1) transmitting the first block of the message through the transmitter;
   d-2) displaying a prompt menu for transmission of blocks starting at a second block following the first block; and
   d-3) transmitting the blocks starting at the second block sequentially while recursively repeating the steps c-1) to d-2).

9. The method according to claim 7, wherein the limit length of the transmission message is determined depending on a selective calling system such that the limit length is shorter than a maximum length of transmission message determined in the selective calling system.

10. The method according to claim 9, wherein the limit length N (N is an positive integer) of the transmission message is determined by the following equation: $N=(N_{OP}-N_{CONV})/2$, where $N_{OP}$ is the maximum number of transmission characters determined by the selective calling system and $N_{CONV}$ is the number of conversion code characters which are added to the transmission message.

11. The method according to claim 9, wherein the limit length is selected from a predetermined set of limit lengths depending on a selective calling system to which a selective call receiver of a called party belongs.

12. A message communication apparatus comprising:
   a receiver for receiving a selective calling signal
   an input section for inputting a desired message in characters;
   a display for displaying information on screen;
   a transmitter for transmitting data in DTMF (Dual Tone Multi-frequency) form;
   a memory for storing a limit length of transmission message and a transmission message which is input through the input section; and
   a controller for controlling split transmission of the transmission message such that a predetermined length of message included in the transmission message is displayed on screen such that a first part of the message which is not longer than the limit length is displayed in a first image and a second part thereof exceeding the limit length is displayed inn a second image different from the first image, and further such that, if the transmission message is longer than the limit length after transmitting the first part of the message through the transmitter, a predetermined indicator is displayed for indicating that the second part is left without transmitted, the predetermined indicator including a prompt menu for the split transmission of the second part which recursively repeats the split transmission until the transmission message has been transmitted.

13. The message communication apparatus according to claim 12, wherein the limit length of the transmission message is determined depending on a selective calling system such that the limit length is shorter than a maximum length of transmission message determined in the selective calling system.

14. The message communication apparatus according to claim 13, wherein the limit length N (N is an positive integer) of the transmission message is determined by the following equation: $N=(N_{OP}-N_{CONV})/2$, where N is the maximum number of transmission characters determined by the selective calling system and $N_{CONV}$ is the number of conversion code characters which are added to the transmission message.

15. The message communication apparatus according to clam 13, wherein the limit length is selected from a predetermined set of limit lengths depending on a selective calling system to which a selective call receiver of a called party belongs.

16. A selective call receiver comprising:
   a receiver for receiving a selective calling signal
   an input section for inputting a desired message in characters;
   a display for displaying information on screen;
   a transmitter for transmitting data in DTMF (Dual Tone Multi-frequency) form;

a first memory for storing a limit length of transmission message, where the limit length is determined by a number of characters;

a second memory for storing a transmission message which is input through the input section, a transmission message consisting of a desired number of characters; and a controller for controlling split transmission such that the transmission message is split into a plurality of blocks each not longer than the limit length and the blocks are sequentially transmitted depending on whether a transmission instruction is input for each block.

17. The selective call receiver according to claim 16, wherein the controller controls such that a predetermined length of message included in the transmission message is displayed on screen such that a first block of the message is displayed in a normal image and blocks other than the first block are displayed in a reverse image, and further such that after transmitting the first block of the message through the transmitter, a prompt menu is displayed on screen for transmission of blocks starting at a second block following the first block and, if the transmission of blocks is selected, the blocks starting at the second block are sequentially transmitted while recursively repeating the split transmission.

18. The selective call receiver according to claim 16, wherein the limit length of the transmission message is determined depending on a selective calling system such that the limit length is shorter than a maximum length of transmission message determined in the selective calling system.

19. The selective call receiver according to claim 18, wherein the limit length N (N is an positive integer) of the transmission message is determined by the following equation: $N=(N_{OP}-N_{CONV})/2$, where $N_{OP}$ is the maximum number of transmission characters determined by the selective calling system and $N_{CONV}$ is the number of conversion code characters which are added to the transmission message.

20. The selective call receiver according to claim 18, wherein the limit length is selected from a predetermined set of limit lengths depending on a selective calling system to which a selective call receiver of a called party belongs.

* * * * *